United States Patent [19]

Yamakawa et al.

[11] Patent Number: 4,900,631
[45] Date of Patent: Feb. 13, 1990

[54] MAGNETIC RECORDING MEDIA

[75] Inventors: Masahiro Yamakawa, Takaoka; Eitaro Nakamura, Tokyo, both of Japan

[73] Assignee: Nippon Zeon Co., Ltd., Tokyo, Japan

[21] Appl. No.: 239,683

[22] Filed: Sep. 2, 1988

Related U.S. Application Data

[60] Division of Ser. No. 931,876, Nov. 17, 1986, Pat. No. 4,851,465, which is a continuation of Ser. No. 729,183, May 1, 1985, abandoned.

[30] Foreign Application Priority Data

May 8, 1984 [JP] Japan ................................. 69-91684

[51] Int. Cl.$^4$ ............................................ B32B 27/36
[52] U.S. Cl. ................................. 428/483; 428/423.1; 428/692; 428/694; 428/900
[58] Field of Search ............... 428/423.1, 423.7, 424.7, 428/480, 483, 692, 694, 900

[56] References Cited

U.S. PATENT DOCUMENTS

| | | | |
|---|---|---|---|
| 4,476,035 | 10/1984 | Miyoshi et al. | 252/62.54 |
| 4,537,911 | 8/1985 | Chonde | 521/28 |
| 4,558,092 | 12/1985 | Reinecke et al. | 524/817 |

FOREIGN PATENT DOCUMENTS 151067 11/1980 Japan.
053572 3/1985 Japan.

Primary Examiner—Christopher Henderson
Attorney, Agent, or Firm—Sherman and Shalloway

[57] ABSTRACT

A copolymer useful for magnetic paints is provided which is composed of (1) at least 60% by weight of vinyl chloride units (2) 0.1 to 4.0% by weight, as a sulfur- or phosphorus-containing strong acid group, of strong acid group-containing monomer units, (3) at least 0.1% by weight, as the hydroxyl groups, of units of a monomer which gives a side chain represented by the formula —X—OH wherein X is an organic group, and (4) 0 to 20% by weight of units of another monomer.

15 Claims, No Drawings

MAGNETIC RECORDING MEDIA

This application is a division of Ser. No. 06/931,876, filed Nov. 17, 1986, now U.S. Pat. No. 4,851,465, which is a continuation of Ser. No. 06/729,183, filed May 1, 1985, now abandoned.

This invention relates to a vinyl chloride resin for use in magnetic paints, particularly as a binder for magnetic recording media.

Magnetic recording media such as magnetic tapes or cards are generally produced by coating a magnetic paint comprising a magnetic powder and a binder on a substrate such as a polyester film to form a magnetic layer thereon. In recent years, finely divided magnetic metal powders having a high specific surface area have come into use as such a magnetic powder in an attempt to increase coercivity, maximum saturation magnetization, SN ratios and recording density.

Since the magnetic metal powders have high surface activity, the use of ordinary binders such as a vinyl chloride/vinyl acetate/vinyl alcohol terpolymer, a vinyl chloride, vinyl acetate/maleic acid terpolymer, or nitrocellulose leads to the difficulty that a magnetic paint is gelled during preparation, or the magnetic metal powders have insufficient dispersibility. A low-molecular-weight surface-active agent is used as a dispersant in order to improve the dispersibility of the magnetic powder. The amount of the dispersant that can be used is limited since when used in large amounts, it will reduce the durability of the resulting magnetic recording medium or cause contamination of a recording head.

On the other hand, in order to increase the durability and reliability of magnetic recording media, attempts are generally made, especially in the production of magnetic videotapes, to crosslink the magnetic layer by adding a flexible material such as a polyurethane resin, a polyester resin or acrylonitrile/butadiene rubber and a crosslinking agent which reacts with a part or the whole of the binder. The binder is therefore required to be compatible with the flexible material and have proper reactivity with the crosslinking agent. The binder is further required in view of the necessity of increasing the reliability of magnetic tapes to have excellent chemical stability and the freedom from generation of decomposition products which will degrade the magnetic powder or cause corrosion of the recording head.

The present inventors have made extensive investigations in order to develop a binder which can meet the higher performance of magnetic recording media, and have found that the use of a specified vinyl chloride resin can give a magnetic paint which maintains high dispersibility, is free from gellation, and has excellent reactivity with crosslinking agents and heat stability, and that a magnetic recording medium obtained by using this magnetic paint has good film surface smoothness and durability and excellent running property, magnetic properties and electromagnetic converting characteristics.

According to this invention, there is provided a resin for use in magnetic paints, said resin being a copolymer composed of (1) at least 60% by weight of vinyl chloride units, (2) 0.1 to 4.0% by weight, as a sulfur- or phosphorus-containing strong acid group, of strong acid group-containing monomer units, (3) at least 0.1% by weight, as the hydroxyl groups, of units of a monomer which gives a side chain represented by the formula —X—OH wherein X is an organic group, and (4) 0 to 20% by weight of units of another monomer.

The resin of this invention can be obtained by copolymirizing in the presence of a radical generator (1') vinyl chloride, (2') a monomer having a sulfur- or phosphorus-containing strong acid group, (3') a monomer having a group represented by the formula —X—OH wherein X is an organic group, and as required (4') another monomer copolymerizable with these monomers.

The monomer (2') having a sulfur- or phosphorus-containing strong acid group may, for example, be a radical-polymerizable monomer having a group derived from a strong acid containing sulfur or phosphorus such as a sulfonic acid, sulfuric acid, phosphoric acid or phosphonic acid, or an alkali metal or ammonium salt of such a strong acid. Of these strong acids, sulfonic acids and their salts are most readily available and include many species. Examples are vinylsulfonic acid, methylvinylsulfonic acid, (meth) allylsulfonic acid, styrenesulfonic acid, ethyl (meth)acrylate-2-1-sulfonate, 2-acrylamide-2-methylpropanesulfonic acid, 3- allyloxy-2-hydroxypropanesulfonic acid, and alkali metal and ammonium salts of these compounds. Examples of monomers having groups derived from sulfuric acid or its salts include ethyl (meth)acrylate-2-sulfate, 3-allyloxy-2-hydroxypropanesulfuric acid, and alkali metal and ammonium salts of these. Examples of monomers having groups derived from phosphoric acid or its salts are propyl (meth)acrylate-3-chloro-2-phosphate, ethyl (meth)acrylate-2-phosphate, 3-allyloxy-2-hydroxypropanephosphate and alkali metal and ammonium salts of these. Examples of monomers having groups derived from phosphonic acid or its salts include vinylphosphonic acid, acrylamidemethanephosphonic acid, ethyl 2-phosphonate-(meth)acrylate, 3-allyloxy-2-hydroxypropanephosphonate, and alkali metal and ammonium salts of these.

Preferred monomers (3') which give a side chain represented by the formula —X—OH are those in which X is organic groups typified b $C_nH_{2n}$, $OC_nH_{2n}$, $COOC_nH_{2n}$ and $CONHC_nH_{2n}$ in which n is an integer of from 1 to 4. Specific examples include alkanol esters of alpha, beta-unsaturated acids such as 2-hydroxyethyl (meth)acrylate, 2-hydroxypropyl (meth)acrylate and 2-hydroxybutyl (meth)acrylate; alkanol esters of unsaturated dicarboxylic acids such as mono-2hydroxypropyl maleate, di-2-hydroxypropyl maleate and mono-2hydroxybutyl itaconate; olefinic alcohols such as 3-buten-1-ol, 5-hexen-1-ol, 4-penten-2-ol and 1-hexen-3-ol; alkanol vinyl ethers such as 2-hydroxyethyl vinyl ether and 2-hydroxypropyl vinyl ether; and acrylamides such as N-methylolacrylamide and N-methylolmethacrylamide.

Of the monomers (3'), those of the type in which OH in the formula —X—OH is bonded to the secondary carbon atom (carbon having one hydrogen atom) of X are preferred in this invention because copolymers obtained by using such monomers have especially good solubility in solvents and an especially long pot life in the presence of a crosslinking agent.

Examples of the other monomer (4') which may be used as required in this invention include vinyl esters of carboxylic acids such as vinyl acetate and vinyl propionate; vinyl ethers such as methyl vinyl ether, isobutyl vinyl ether and cetyl vinyl ether; vinylidene halides such as vinylidene chloride and vinylidene fluoride;

unsaturated carboxylic acids such as acrylic acid, methacrylic acid, maleic acid and itaconic acid; unsaturated carboxylic acid anhydrides such as maleic anhydride; esters of unsaturated carboxylic acids such as diethyl maleate, butylbenzyl maleate, dimethyl itaconate, methyl (meth)acrylate, ethyl (meth)acrylate and lauryl (meth)acrylate; olefins such as ethylene and propylene; unsaturated nitriles such as (meth)acrylonitrile; and aromatic vinyl compounds such as styrene, alpha-methylstyrene and p-methylstyrene.

These monomers (4') are properly chosen in order to increase the solubility of a mixture of the resin of this invention with another resin while regulating the compatibility of these resins with each other and their softening points, or to improve the properties of the coated film or the coating process.

The resin of this invention may be produced by any of known polymerization methods. In view of the solubility of the polymer, it is preferably produced by solution polymerization, or by a suspension polymerization method using a lower alcohol such as methanol or ethanol or a combination of it with deionized water as a polymerization medium.

Suitable polymerization initiators that may be used in the polymerization process include, for example, organic peroxides such as lauroyl peroxide, benzoyl peroxide, 3,5,5-trimethylhexanoyl peroxide, diisopropyl peroxydicarbonate, di-2-ethylhexyl peroxydicarbonate, di-2-ethoxyethyl peroxydicarbonate, 1-butyl peroxypivalate and 1-butyl peroxyneodecanoate; azo compounds such as 2,2'-azobisisobutyronitrile, 2,2'-azobis-2,4-dimethylvaleronitrile and 4,4'-azobis-4-cyanovaleric acid; and inorganic peroxides such as potassium persulfate, ammonium persulfate and ammonium perphosphate.

Suitable suspension stabilizers that may be used in the polymerization process include, for example, polyvinyl alcohol and a partially saponified product of polyvinyl acetate; cellulose derivatives such as methyl cellulose, hydroxypropyl cellulose and carboxymethyl cellulose; synthetic polymers such as polyvinyl pyrrolidone, polyacrylamide, maleic acid/styrene copolymer, maleic acid/methyl vinyl ether copolymer and maleic acid/vinyl acetate copolymer; and natural polymers such as starch and gelatin.

Suitable emulsifiers that may be used in the polymerization process include, for example, anionic emulsifiers such as sodium alkylbenzenesulfonates or sodium laurylsulfate, and nonionic emulsifiers such as polyoxyethylene alkyl ethers and partial esters of polyoxyethylene sorbitan fatty acids.

As required, molecular weight controlling agents such as trichloroethylene or thioglycol may be used in the polymerization process.

The aforesaid radical initiator, vinyl chloride, the other monomers, the suspending agent the emulsifier, the molecular weight controlling agent, etc. may be added at a time at the start of polymerization, or portionwise during the polymerization. The polymerization is usually carried out at a temperature of 35 to 80° C. with stirring.

The resulting resin should contain at least 60% by weight of the vinyl chloride units (1). If the proportion of the units (1) is less than 60% by weight, the compatibility of the resin with a flexible material is reduced, or the separation of the solvent from the coated film becomes very difficult.

The amount of the strong acid group-containing monomer units (2) bonded to the resin should be 0.1 to 4.0% by weight, preferably 0.3 to 3.0% by weight, as $-SO_3$, $-SO_4$, $-PO_4$, $-PO_3$, etc. If it is less than 0.1% by weight, the dispersibility of a magnetic powder in the resin is insufficient. If it exceeds 4.0% by weight, the resin has increased hydrophilicity and insufficient solubility in solvents, and a magnetic paint prepared by using it is liable to gel and thicken. Furthermore, the moisture resistance of a coated film formed from the paint is reduced, or the magnetic powder aggregates and has poor dispersibility.

The amount of the monomer units (3) which give the side chain —X—OH should be at least 0.1% by weight as the hydroxyl groups. If it is less than 0.1% by weight, the crosslinking effect of an isocyanate compound on the coated magnetic layer cannot be exhibited. The upper limit of the amount of the hydroxyl groups is preferably 2.0% by weight. If it is larger than 2.0% by weight, the resulting paint has a very short pot life and is difficult to use. The above-specified amount of the hydroxyl group is much smaller than the amount of hydroxyl groups in the vinyl chloride/vinyl alcohol/vinyl acetate copolymer known heretofore to be usable for magnetic paints. In spite of this fact, the resin of this invention fully reacts with the isocyanate compound to form a crosslinkage. Although no clear reason has yet been assigned to it, it is presumed that the hydroxyl groups which participate in the reaction are remote from the main chain of the copolymer and have an increased degree of freedom, and also the hydroxyl groups are uniformly distributed in the copolymer.

The amount of the other monomer units (4) should be 0 to 20% by weight. If it exceeds 20% by weight, the separation of the solvent from the paint becomes poor, and the softening point of the copolymer becomes low. Consequently, the heat-resistant running property of a magnetic recording medium prepared by using it tends to be degraded.

The resin has a degree of polymerization of 100 to 900, preferably 200 to 500. If it is less than 100, the resulting magnetic layer has insufficient abrasion resistance. If it exceeds 900, the viscosity of the paint is high, and dispersion of a magnetic powder in it tends to be insufficient.

The resin of this invention obtained as above, as in the case of ordinary vinyl chloride resin binders for magnetic paints, is prepared into a solution in a solvent together with a flexible material such as a polyurethane resin, polyester resin or acrylonitrile-butadiene copolymer, a crosslinking agent typified by polyisocyanates, and a magnetic powder, and as required, other known materials such as a lubricant, a dispersant, an antistatic agent and an abrasive agent.

Typical examples of the polyurethane resin are those obtained by the reaction of polyester polyols or polyether polyols with isocyanates. Preferred are those which have remaining hydroxyl groups.

Magnetic metallic powders such as Fe and Co powders are preferred as the magnetic powder, but iron oxide powders such as $\gamma-Fe_2O_3$, $Fe_3O_4$, Co-containing $\gamma-Fe_2O_3$, Co-containing $Fe_3O_4$ and barium ferrite and $CrO_2$ powder may also be used.

As required, the resin of this invention may be used in combination with an ordinary resin binder for magnetic paints, such as a vinyl chloride/vinyl acetate copolymer, a vinyl chloride/vinyl alcohol/vinyl acetate copolymer, a cellulosic resin, a phenoxy resin, an amino resin, an epoxy resin, a butyral resin or an acrylic resin, within the range in which the purpose of the present invention can be achieved.

Since the resin of this invention contains units from a hydroxyl-containing monomer other than vinyl alcohol, it does not undergo degradation by saponification treatment. In addition, the resin of this invention can exhibit higher heat stability than the conventional vinyl chloride/vinyl alcohol/vinyl acetate copolymer or a vinyl chloride copolymer containing a strong acid group prepared from the first-mentioned copolymer as a starting material. Hence, by using the resin of this invention, there can be produced a magnetic recording medium which has excellent reliability and does not easily corrode a recording head.

The following examples illustrate the present invention more specifically. All parts in these examples are by weight.

EXAMPLE 1

A polymerization vessel was charged with 117 parts of methanol, 0.6 part of methyl cellulose and 0.2 part of a partial ester of polyoxyethylene sorbitan fatty acid, and sealed up. After deaeration under reduced pressure, 100 parts of vinyl chloride and 10 parts of vinyl acetate were fed, and the mixture was stirred at 50° C. Thereafter, 0.6 part of 3,3,5-trimethylhexanoyl peroxide was introduced to start the polymerization of the monomers. At the same time, 3 parts of 2-acrylamide-2-methylpropanesulfonic acid and 8 parts of 2-hydroxypropyl methacrylate dissolved in 80 parts of methanol were continuously charged at a constant rate so that all of them would be consumed in 8 hours. After the lapse of 10 hours when the pressure of the polymerization vessel reached 2 kg/cm$^2$, the reaction mixture was cooled, and the unreacted vinyl chloride was recovered. The liquid portion was removed, and the solid was washed and dried to give a resin (A).

EXAMPLE 2

A resin (B) was prepared by operating in the same way as in Example 1 except that ethyl methacrylate-2-phosphate was used instead of 2-acrylamide-2-methylpropanesulfonate.

EXAMPLE 3

A resin (C) was prepared by operating in the same way as in Example 1 except that sodium styrenesulfonate was used instead of 2-acrylamide-2-methylpropanesulfonate.

EXAMPLE 4

A polymerization vessel was charged with 80 parts of acetone, 70 parts of deionized water, 2 parts of lauroyl peroxide, 10 parts of 3-buten-1-ol, 10 parts of ammonium 3-allyloxy-2-hydroxypropanesulfate and 10 parts of isobutylvinyl ether. After deaeration, 100 parts of vinyl chloride was introduced, and the mixture was heated to 55° C. When the polymerization pressure reached 3 kg/cm$^2$, the unreacted vinyl chloride was recovered under reduced pressure. The reaction mixture was mixed with 1000 parts of deionized water, and the resin was separated and dried. The final product is designated resin (D).

EXAMPLE 5

A resin (E) was prepared in the same way as in Example 4 except that sodium 3-allyloxy-2-hydroxypropanephosphonate was used instead of ammonium 3-allyloxy-2-hydroxy-propanesulfate.

COMPARATIVE EXAMPLE 1

A resin (F) was prepared by operating in the same way as in Example 1 except that propyl methacrylate was used instead of 2-hydroxypropyl methacrylate.

COMPARATIVE EXAMPLE 2

A resin (G) was prepared in the same way as in Example 1 except that 2-acrylamide-2-methylpropanesulfonic acid was not used.

COMPARATIVE EXAMPLE 3

One hundred parts of vinyl chloride/vinyl acetate/vinyl alcohol copolymer (composition:91% by weight of vinyl chloride, 3% by weight of vinyl acetate and 6% by weight of vinyl alcohol), 10 parts of sodium 2-chloroethylsulfonate and 500 parts of dimethylformamide were mixed at 20° C. with stirring. Five parts of pyridine was added dropwise little by little with stirring. The mixture was stirred for 3 hours. The reaction mixture was mixed with 5000 parts of deionized water, and the resin was recovered. It was dissolved in tetrahydrofuran, re-precipitated from methanol, and dried to give a final product (resin H).

COMPARATIVE EXAMPLE 4

A polymerization vessel was charged with 180 parts of acetone, 2 parts of benzoyl peroxide, and 25 parts of vinyl acetate. After deaeration, 50 parts of vinyl chloride was introduced, and the polymerization of the monomers was started at 55° C. Then, a mixture of 3 parts of sodium styrenesulfonate and 17 parts of deionized water was continuously introduced at a constant rate over 8 hours, and in the meantime, 50 parts of vinyl chloride was fed in four portions. After performing the reaction for 10 hours, the unreacted vinyl chloride was recovered, and the polymer solution was obtained. Methanol (300 parts) and 6 parts of 65% nitric acid were added to the polymer solution, and the mixture was stirred at 80° C. for 12 hours to saponify the vinyl acetate units. Furthermore, 1000 parts of deionized water was added to remove the resin. Four hundred parts of acetone and 5 parts of propylene oxide were added to the resin, and they were mixed at 80° C. for 2 hours. The reaction mixture was mixed with 1000 parts of methanol. The liquid portion was removed, and the solid was dried to obtain a resin (I).

The properties of the resins A to I and commercial vinyl chloride/vinyl acetate/maleic acid terpolymer (J) and vinyl chloride/vinyl acetate/vinyl alcohol terpolymer (K) are tabulated below. The amount of the hydroxyl groups in the resin was determined by infrared absorption spectroscopy. The amount of vinyl chloride was determined by measuring the amount of chlorine by burning the amount of the strong acid group was determined by elemental analysis and infrared absorption spectroscopy.

Magnetic paints and magnetic recording media were produced by using the resins A to K (vinyl chloride copolymers), and tested for their properties. The results are also tabulated.

The testing methods were as follows:

(1) Solubility

A solution composed of 100 parts of the vinyl chloride copolymer, 200 parts of methyl ethyl ketone and 200 parts of toluene was prepared. The transparency of the solution was visually observed, and evaluated on a scale of ◯(excellent), Δ(moderate), and X (poor).

(2) Heat stability

The vinyl chloride copolymer (1.0 g) was taken into a 15 cc test tube, and its opening portion was stopped by an absorbent cotton holding Congo Red test paper. The test tube was placed in an oil bath at 150° C., and the time (minutes) which elapsed until the Congo Red test paper changed in color by generated HCl was measured.

(3) Dispersion stability

A mixture composed of 400 parts of a magnetic metallic iron powder, 100 parts of the vinyl chloride copolymer 300 parts of methyl ethyl ketone, 300 parts of methyl isobutyl ketone and 300 parts of toluene was dispersed under high speed shear for 90 minutes. The resulting dispersion was taken into a sample bottle, and stored in a constant temperature bath at 25° C. The state of occurrence of a gel was observed. The occurrence of a gel was determined by taking out a portion of the dispersion on a glass plate, diluting it with about 5 times its amount of methyl ethyl ketone, and observing the dilution visually while stirring it with a glass rod. The amount of the gel was expressed on a scale of ◯(none), Δ(medium) and X (large).

(4) Gloss

A mixture composed of 400 parts of a magnetic metallic iron powder, 70 parts of the vinyl chloride copolymer, 30 parts of a polyurethane resin (Nippolane 2304, a product of Nippon Polyurethane Industry Co., Ltd.), 300 parts of methyl ethyl ketone, 300 parts of methyl isobutyl ketone, 300 parts of toluene, 4 parts of higher fatty acid and 2 parts of silicone oil was dispersed under high-speed shear for 90 minutes, and then 15 parts of polyisocyanate (Coronate L, a product of Nippon Polyurethane Industry Co., Ltd.) and 100 parts of cyclohexanone were added. The mixture was further dispersed for 90 minutes. The resulting magnetic coating composition (magnetic paint) wa coated on a polyester film to a thickness of 5 micrometers, subjected to a magnetic field orientation treatment, and dried. The reflectance of the magnetic coated layer at a reflection angle of 60° was measured by a glossmeter.

(5) Squareness ratio (Br/Bm)

A sample having a size of 12.5 mm × 50 mm was cut out from the magnetic coated layer used in the measurement of gloss, and the squareness ratio of the sample was measured by a magnetic characteristic measuring device.

(6) Durability

The magnetic coated layer used in the measurement of gloss was smoothed by a calender roll, and heat-treated at 65° C. for 65 hours. It was then kept in contact under a load of 100 g with a rotating drum having abrasive paper attached to its surface. The drum was rotated at a speed of 150 rpm, and the amount of the magnetic paint adhering to the abrasive paper at this time was visually observed and expressed on a scale of ◯(small), Δ(medium) and X (large).

(7) Running property

The force generated between the magnetic coated layer and the rotating drum was measured by a U gauge in an atmosphere kept at a temperature of 65° C. and a relative humidity of 80%. The force is used as a measure of running resistance and expressed on a scale of ◯(small), Δ(medium) and X (large).

|  | Example |  |  |  |  | Comparative Example |  |  |  |  |  |
|---|---|---|---|---|---|---|---|---|---|---|---|
|  | 1 | 2 | 3 | 4 | 5 | 1 | 2 | 3 | 4 | 5 | 6 |
| Properties of the resin |  |  |  |  |  |  |  |  |  |  |  |
| Sample designation | A | B | C | D | E | F | G | H | I | J | K |
| Vinyl chloride (wt. %) | 85 | 86 | 87 | 88 | 88 | 85 | 87 | 90 | 86 | 86 | 91 |
| Strong acid groups (wt. %) | 1.0 | 0.8 | 0.6 | 1.4 | 1.3 | 0.9 | — | 1.0 | 1.0 | 0.8 (*1) | — |
| Hydroxyl groups (wt. %) | 0.9 | 0.9 | 0.9 | 0.8 | 0.9 | — | 1.0 | 2.1 (*2) | 2.7 (*2) | — | 2.3 |
| Degree of polymerization | 320 | 320 | 340 | 290 | 300 | 310 | 380 | 430 | 360 | 400 | 430 |
| Characteristics of the magnetic paint or the magnetic recording medium |  |  |  |  |  |  |  |  |  |  |  |
| Solubility |  |  |  |  |  |  |  |  |  |  |  |
| Heat stability (minutes) | 20 | 20 | 22 | 20 | 21 | 20 | 28 | 3 | 4 | 15 | 6 |
| Dispersion stability |  |  |  |  |  |  | — (*3) |  |  | X | X |
| Gloss (%) | 96 | 96 | 88 | 93 | 93 | 97 | — | 77 | 82 | 30 | 10 |
| Squareness ratio | 0.82 | 0.82 | 0.81 | 0.81 | 0.81 | 0.82 | — | 0.79 | 0.80 | 0.68 | 0.66 |
| Durability |  |  |  |  |  | Δ | — | Δ | Δ | X | X |
| Running property |  |  |  |  |  | X | — |  | Δ | X | Δ |

(*1): Carboxyl group
(*2): Hydroxyl group based on vinyl alcohol
(*3): The magnetic powder did not disperse uniformly, and a paint could not be prepared.

What is claimed is:

1. A magnetic recording media comprising a polyester substrate and a magnetic layer coated on said substrate, said magnetic layer comprising a polyisocyanate cross-linked vinyl chloride copolymer binder and a magnetic powder dispersed in said binder, said vinyl chloride copolymer comprising (1) at least 60% by weight of vinyl chloride subunits,
(2) 0.1 to 4.0% by weight, as a sulfur- or phosphorus-containing strong acid group, of strong acid group-containing monomer subunits,
(3) at least 0.1% by weight, as the hydroxyl groups, of subunits of a monomer which gives a side chain represented by the formula —X—OH wherein X is an organic group selected from the group consisting of $C_nH_{2n}$, $OC_nH_{2n}$, $COOC_nH_{2n}$ and $CONHC_nH_{2n}$, where n is an integer of 1 to 4, and
(4) 0 to 20% by weight of subunits of another monomer selected from the group consisting of vinyl esters of carboxylic acids, vinyl ethers, vinylidene halides, unsaturated carboxylic acids, unsaturated carboxylic acid anhydrides, esters of unsaturated carboxylic acids, olefins, unsaturated nitriles and aromatic vinyl compounds.

2. The magnetic recording media of claim 1 wherein said magnetic layer further comprises a flexibility promoting agent selected from the group consisting of polyurethane resin, polyester resin and acrylonitrile/butadiene copolymer.

3. The magnetic recording media of claim 2 wherein said flexibility promoting agent is a polyurethane resin which is the reaction product of a polyether polyol or polyester polyol and an isocyanate.

4. The magnetic recording media of claim 1 wherein said component (2) is a sulfur-containing strong acid group which is derived from a sulfonic acid, sulfuric acid, an alkaline metal salt of sulfonic acid, an alkaline metal salt of sulfuric acid, an ammonium salt of sulfonic acid or an ammonium salt of sulfuric acid.

5. The magnetic recording media of claim 1 wherein the component (2) is a phosphorus-containing strong acid group derived from phosphoric acid, phosphonic acid, an alkaline metal salt of phosphoric acid, an alkaline metal salt of phosphonic acid, an ammonium salt of phosphoric acid or an ammonium salt of phosphonic acid.

6. The magnetic recording media of claim 1 wherein said vinyl copolymer has a degree of polymerization of 100 to 900.

7. The magnetic recording media of claim 1 wherein said vinyl chloride copolymer has a degree of polymerization of 200 to 500.

8. The magnetic coating composition of claim 1 wherein the strong acid group-containing monomer subunits (2) are derived from a monomer selected from the group consisting of vinylsulfonic acid, methylvinylsulfonic acid, (meth)allylsulfonic acid, styrenesulfonic acid, ethyl (meth)acrylate-2-sulfonate, 2-acrylamide-2-methylpropanesulfonic acid, 3-allyloxy-2-hydroxypropanesulfonic acid and the alkali metal and ammonium salts thereof.

9. The magnetic recording media of claim 1 wherein the strong acid group-containing monomer subunits (2) are derived from a monomer selected from the group consisting of ethyl (meth)acrylate-2-sulfate, 3-allyloxy-2-hydroxypropanesulfonic acid and the alkali metal and ammonium salts thereof.

10. The magnetic recording media of claim 1 wherein the subunits of the monomer (3) are derived from a monomer selected from the group consisting of 2-hydroxyethyl (meth)acrylate, mono-2-hydroxypropyl (meth)acrylate, 2-hydroxybutyl (meth)acrylate, mono-2-hydroxybutyl maleate, di-2-hydroxypropyl maleate, mono-2-hydroxybutyl itaconate, 3-buten-1-ol,5-hexen-1-ol, 4-panten-2-ol, 1-hexen-3-ol, 2-hydroxypropyl vinyl ether, N-methylolacrylamide and N-methylolmethacrylamide.

11. The magnetic recording media of claim 1 wherein said copolymer contains subunits of said another monomer (4), said monomer being selected from the group consisting of vinyl acetate, vinyl propionate, methyl vinyl ether, isobutyl vinyl ether, cetyl vinyl ether, vinylidene chloride, vinylidene fluoride, acrylic acid, methacrylic acid, maleic acid, itaconic acid, maleic anhydride, diethyl maleate, butylbenzyl maleate, dimethyl itaconate, methyl (meth)acrylate, ethyl (meth)acrylate, lauryl (meth)acrylate, ethylene, propylene, (meth)acrylonitrile, styrene, alpha-methylstyrene and p-methylstyrene.

12. The magnetic recording media of claim 1 wherein said copolymer contains from 0.1% by weight to 2.0% by weight, as the hydroxyl group, of said subunits (3).

13. The magnetic recording media of claim 1 wherein the magnetic powder is Fe, Co, $\alpha$-$Fe_2O_3$, $Fe_3O_4$, Co-containing ---$Fe_2O_3$, Co-containing $Fe_3O_4$, barium ferrite or $CrO_2$.

14. The magnetic recording media of claim 1 wherein said vinyl chloride copolymer comprises at least 60% by weight of said vinyl chloride subunits (1), from 0.3 to 3.0% by weight of the strong acid group-containing monomer subunits (2), from 0.1 to 2.0% by weight, as the hydroxyl groups, of the monomer subunits (3) and up to 20% by weight of the subunits of said other monomer (4).

15. The magnetic recording media of claim 14 wherein the subunits of said other monomer (4) are present.

* * * * *

UNITED STATES PATENT AND TRADEMARK OFFICE
CERTIFICATE OF CORRECTION

PATENT NO. : 4,900,631
DATED : February 13, 1990
INVENTOR(S) : MASAHIRO YAMAKAWA ET AL.

It is certified that error appears in the above-identified patent and that said Letters Patent is hereby corrected as shown below:

Claim 10, lines 7 and 8 of the claim,
"3-buten-1-ol,5-hexen-1-ol" should read
--3-buten-1-ol, 5-hexen-1-ol--;
line 8 of the claim, "4-panten-2-ol" should read
--4-penten-2-ol--; and
still line 8 of the claim, after "1-hexen-3-ol,",
insert --2-hydroxyethyl vinyl ether,--.

Signed and Sealed this

Twelfth Day of March, 1991

*Attest:*

HARRY F. MANBECK, JR.

*Attesting Officer*      *Commissioner of Patents and Trademarks*